United States Patent
Sakai

(10) Patent No.: US 7,257,675 B2
(45) Date of Patent: Aug. 14, 2007

(54) DISK ARRAY DEVICE HAVING SNAPSHOT SIMULATION FUNCTION

(75) Inventor: Tomohiro Sakai, Tokyo (JP)

(73) Assignee: NEC Corporation, Tokyo (JP)

( * ) Notice: Subject to any disclaimer, the term of this patent is extended or adjusted under 35 U.S.C. 154(b) by 471 days.

(21) Appl. No.: 10/968,017

(22) Filed: Oct. 20, 2004

(65) Prior Publication Data

US 2005/0086432 A1    Apr. 21, 2005

(30) Foreign Application Priority Data

Oct. 21, 2003    (JP)    ............... 2003-360067

(51) Int. Cl.
   *G06F 12/00*    (2006.01)
(52) U.S. Cl. ............... 711/114; 711/162; 703/21
(58) Field of Classification Search ............ 703/21, 703/22; 711/114, 162
   See application file for complete search history.

(56) References Cited

U.S. PATENT DOCUMENTS 6,131,148 A * 10/2000 West et al. ............. 711/162
7,031,975 B2 * 4/2006 Kanie ..................... 707/102
2005/0038836 A1 * 2/2005 Wang ...................... 707/204

FOREIGN PATENT DOCUMENTS

| JP | 2001-216185 A | 8/2001 |
| JP | 2002-278819 A | 9/2002 |
| JP | 2002-373093 A | 12/2002 |

* cited by examiner

*Primary Examiner*—Gary Portka
*Assistant Examiner*—Hamdy Ahmed
(74) *Attorney, Agent, or Firm*—Sughrue Mion, PLLC

(57) ABSTRACT

A disk array device enabling an appropriate estimation of a physical disk capacity necessary prior to introducing a snapshot function. If a valid flag of the snapshot simulation function of a specified logical volume is on at receiving a data updating request from the host 100, snapshot simulation function control means 21 inquiries with update range determination means 10 and receives notice of bits on a bitmap corresponding to a range of update data, sets corresponding bits on a bitmap of the specified logical volume of bitmap information storage means 12 by means of bitmap information updating means 11, and executes data updating processing. Upon receiving an instruction of reporting a simulation result, snapshot simulation result reporting means 22 reports a physical disk capacity of the snapshot calculated by the snapshot simulation function.

9 Claims, 8 Drawing Sheets

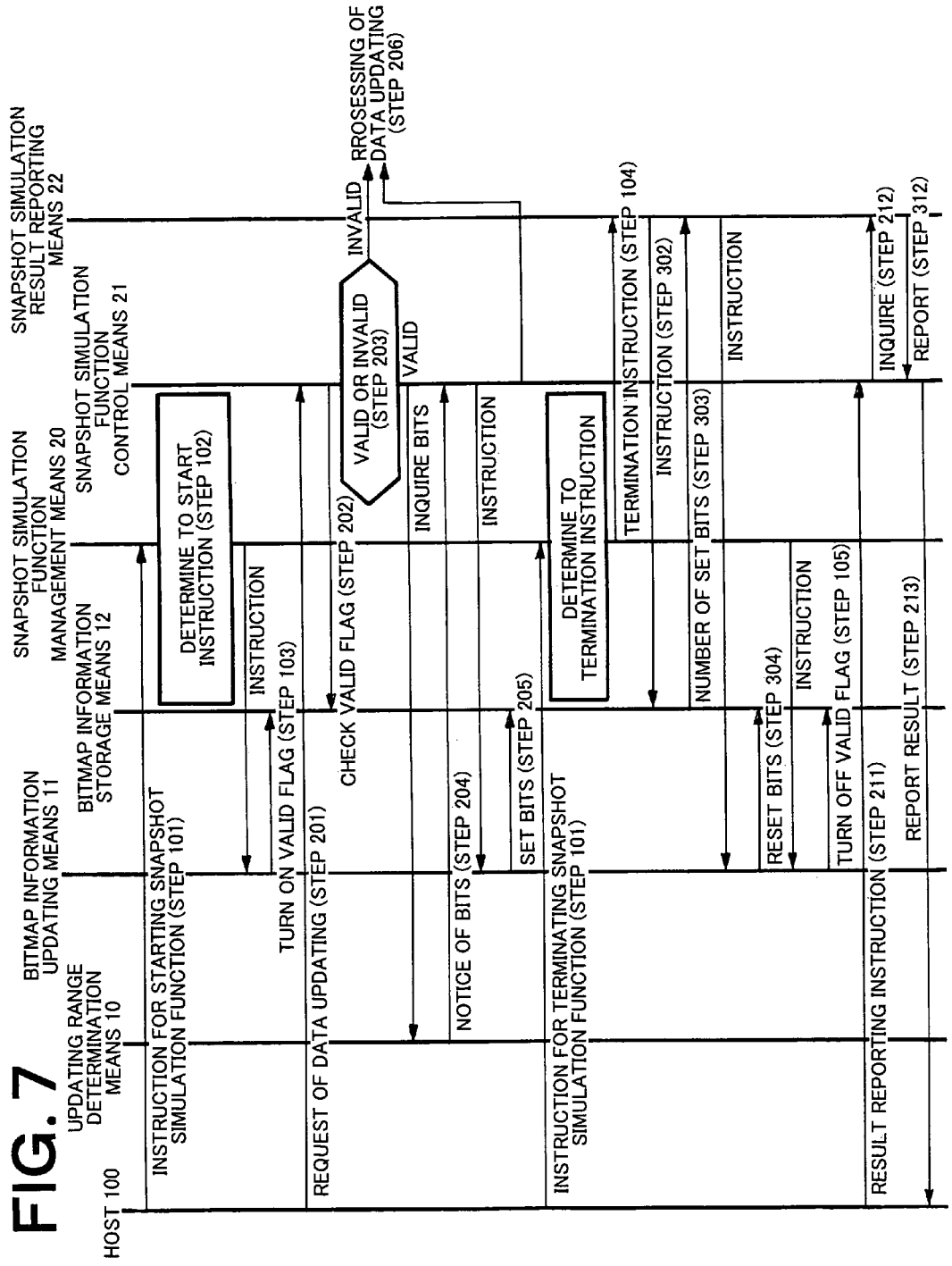

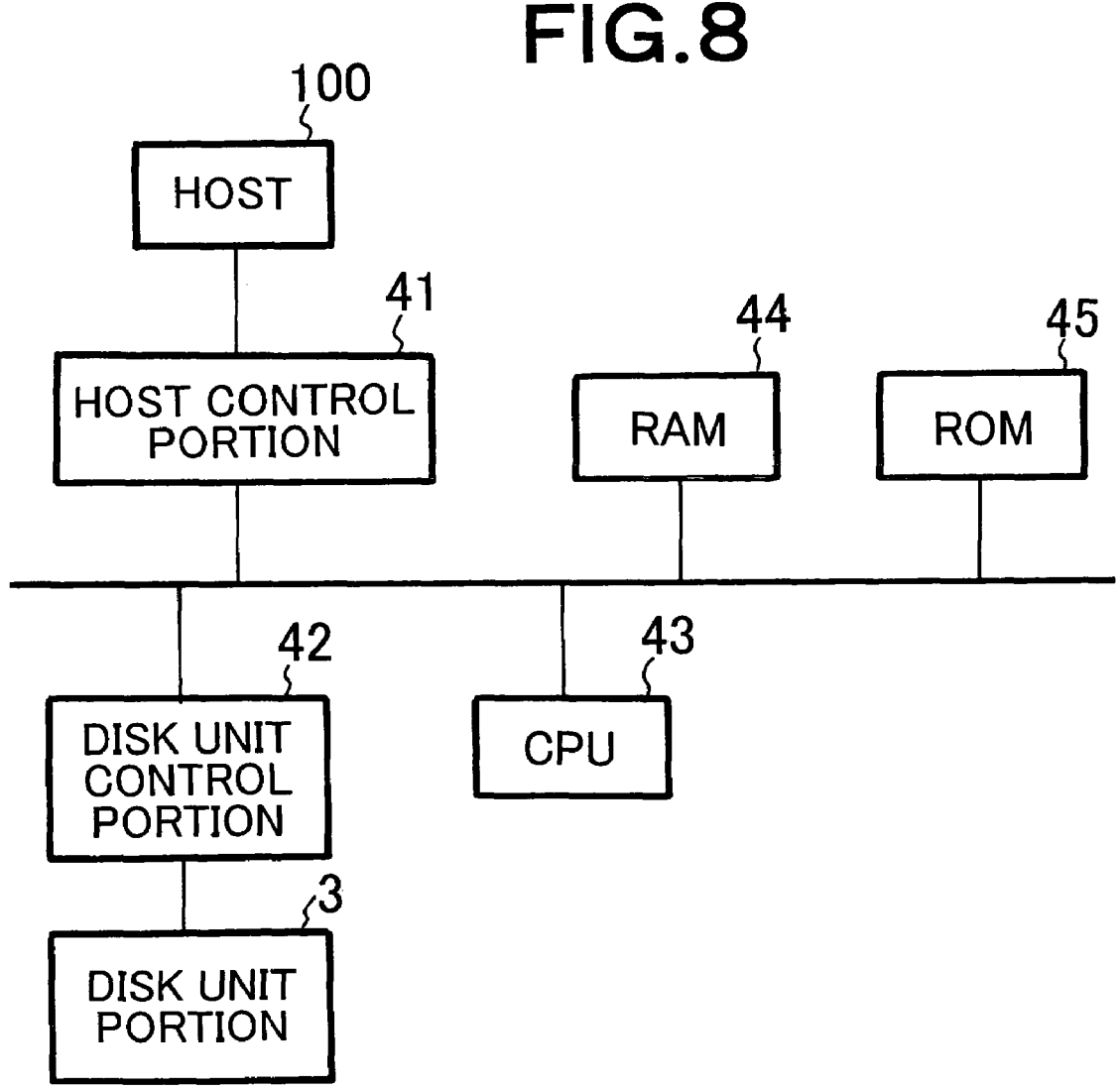

DISK ARRAY DEVICE HAVING SNAPSHOT SIMULATION FUNCTION

BACKGROUND OF THE INVENTION

1. Field of the Invention

The present invention relates to a disk array device and particularly, to a disk array device having a snapshot simulation function.

2. Related Background Art

A disk array device is provided with a plurality of disk drives and it is known as an external storage of a host computer.

A snapshot function, which has become popular as a function of a disk array device, is used to store data at a time point specified by a user. For storing the data, there is a method comprising duplicating data of two logical volumes in advance and separating the data according to an instruction of creating a snapshot or a method comprising copying data in an updated area (update data) for the logical volumes after creating a snapshot and managing the data.

In the data storing method of copying and managing the update data, only updated differentials are stored. Therefore, it is possible to make copies of a plurality of generations efficiently in capacity by using a virtual disk and a required area is secured newly when the data has been updated. Thus, it has an advantage of being more efficient in capacity than the method of duplicating the logical volumes in advance.

For example, in the conventional method of storing only update differentials, the host computer issues a pair formation request and a pair separation request to a disk subsystem, creates a snapshot of volume and after that, starts the processing. A position of data updated after creation of the snapshot is stored in the disk subsystem as differential information. Upon receiving a data restoration request from the host computer, the disk subsystem restores data at a position where update is performed from the snapshot on the basis of the differential information. This enables a restoration of data destroyed due to a fault or the like, which occurs during execution of processing, from backup data at high speed (See pages 3 to 4 and FIG. 1 of JP-A-2001-216185).

In another example of the conventional method of storing only update differentials, a first data holding portion performs ordinary read/write processing. A second data holding portion saves the snapshot image of the first data holding portion at a certain time point. A third data holding portion saves history information containing update data with data-rewriting to the first data holding portion after the time point of saving the snapshot image in the second data holding portion, information indicating the generation thereof, and information indicating the update area thereof. A data read source selecting portion acquires the saving place of the snapshot image to be read by referring to each of history information saved in the third data holding portion according to the designation of the generation and area of the snapshot image to be read and switches the read source of data to the second data holding portion or the third data holding portion according to the saving place. This enables a system to be composed of the few storage devices (more compact and inexpensive) and to arbitrarily read snapshot images of a plurality of generations (See page 4 and FIG. 1 of JP-A-2002-278819).

Furthermore, in still another example of the conventional method of storing only update differentials, two logical disks are assumed a master logical disk and a snapshot logical disk: the two logical disks have the same stored contents if they are arranged in a mirror configuration, or the contents of the master logical disk (snapshot differential information) is stored in the snapshot logical disk in the case of mirror separation. The snapshot differential information is stored in a list format differential information table just after the mirror separation. In the case that the list format differential information table is full and also, a new entry cannot be added, that is, in the case that a differential information table area for storing the list format differential information table cannot be expanded, the list format differential information table is converted into a bitmap format differential information table, and after that, snapshot differential information is stored in the bitmap format differential information table. This makes the copy data quantity reducible in spite of being of a relatively small memory capacity in comparison with the case where a bitmap format is singly used, by using the bitmap format and a list format properly to store snapshot differential information (See page 6 to 7 and FIG. 4 of JP-A-2002-373093).

In the disk array device using just these conventional methods of storing only update differentials, a physical disk capacity is allocated to a virtual disk after data updating is performed. The physical disk capacity to be allocated does not correspond directly to an update data quantity itself, but corresponds to management units (blocks) which are divided and managed by the disk array device in the inside thereof. Therefore, it is a generally used method to store information on presence or absence of updating (differential information) as a bitmap for each management unit of a logical volume in order to manage the range of the update data. The size of the management unit is arbitrary. A large size of the management unit reduces a size of the bitmap, but it deteriorates the efficiency in capacity of the physical disk to the contrary. The reason is that even data updating whose range is smaller than the management unit requires a physical disk capacity of the management unit including the range of the update data. Therefore, in general, the physical disk capacity necessary for the snapshot is not the same as the update data quantity from the host computer, but it is lager than the update data quantity. For example, if the management unit is 32 kilo bytes (KB), the 32 KB physical disk capacity is reserved for 4 KB data updating. While sequential data updating uses all of 32 KB areas of the management unit, random data updating requires a new 32 KB physical disk capacity to be ensured every time 4 KB data is updated.

Therefore, the required physical disk capacity depends upon input-output characteristics (operation contents) of an application program (operation job) operating in the host computer. Thus, it has been difficult to estimate the physical disk capacity necessary for the snapshot until the operation is put into practice.

That is, in the conventional disk array devices, it is difficult to estimate the required physical disk capacity until the snapshot is practically created, since the physical disk capacity practically required depends upon input-output characteristics of an application program operating in the host computer even for the same update data quantity.

SUMMARY OF THE INVENTION

It is an object of the present invention to provide a disk array device capable of estimating the physical disk capacity of an appropriate snapshot by a snapshot simulation function before practically creating the snapshot and having a snapshot simulation function enabling an economical structural design.

According to one aspect of the present invention, there is provided a disk array device having a snapshot simulation function, comprising: bitmap information storage means for storing a bitmap indicating presence or absence of updating for each management unit of a logical volume; bitmap information updating means for updating the bitmap of the bitmap information storage means; updating range determination means for determining which management units of the logical volume cover a range of specified update data and giving notice of bits on the bitmap of the bitmap information storage means corresponding to the management units; snapshot simulation function management means for turning on a valid flag of the snapshot simulation function according to an external instruction of starting the snapshot simulation function to start the snapshot simulation function and turning off the valid flag of the snapshot simulation function according to an external instruction of terminating the snapshot simulation function to terminate the snapshot simulation function; snapshot simulation function control means for inquiring with the updating range determination means and receiving notice of the bits on the bitmap corresponding to the range of update data, setting the corresponding bits on the bitmap in the bitmap information storage means by the bitmap information updating means, and executing data updating processing, if the valid flag of the snapshot simulation function is on when a data updating request is issued; and snapshot simulation result reporting means for checking the number of bits set on the bitmap of the bitmap information storage means, calculating and storing the number of bits multiplied by a management unit size as a physical disk capacity of a snapshot, resetting all bits on the bitmap of the bitmap information storage means by the bitmap information updating means, and reporting the physical disk capacity of the stored snapshot according to an external instruction of reporting the simulation result, when receiving an instruction of terminating the snapshot simulation function from the snapshot simulation function management means.

According to another aspect of the present invention, there is provided a disk array device having a snapshot simulation function, comprising: bitmap information storage means for storing a valid flag indicating whether a snapshot simulation function is effective for each logical volume and a bitmap indicating presence or absence of updating for each management unit of the logical volume; bitmap information updating means for updating the valid flag of the bitmap information storage means and the bitmap; updating range determination means for determining which management units of the logical volume cover a range of specified update data and giving notice of bits on the bitmap corresponding to the logical volume of the bitmap information storage means corresponding to the management units; snapshot simulation function management means for turning on a valid flag of the snapshot simulation function about a specified logical volume according to an external instruction of starting the snapshot simulation function to start the snapshot simulation function about the logical volume and turning off the valid flag of the snapshot simulation function of the specified logical volume according to an external instruction of terminating the snapshot simulation function to terminate the snapshot simulation function of the logical volume; snapshot simulation function control means for inquiring with the updating range determination means and receiving notice of the bits on the bitmap corresponding to the range of update data, setting the corresponding bits on the bitmap for the specified logical volume in the bitmap information storage means by the bitmap information updating means, and executing data updating processing, if the valid flag of the snapshot simulation function about the specified logical volume is on when a data updating request is issued; and snapshot simulation result reporting means for checking the number of bits set on the bitmap corresponding to the logical volume of the bitmap information storage means, calculating and storing the number of bits multiplied by a management unit size as a physical disk capacity of a snapshot, resetting all bits on the bitmap corresponding to the logical volume in the bitmap information storage means by the bitmap information updating means, and reporting the physical disk capacity of the stored snapshot according to an external instruction of reporting the simulation result, when receiving an instruction of terminating the snapshot simulation function from the snapshot simulation function management means.

According to still another aspect of the present invention, there is provided a snapshot simulation method, comprising the steps of: starting a snapshot simulation function by turning on a valid flag of the snapshot simulation function according to an external instruction of starting the snapshot simulation function; determining which management units of a logical volume cover a range of specified update data, setting corresponding bits on a bitmap, and executing data updating processing, if the valid flag of the snapshot simulation function is on when a data updating request is issued; terminating the snapshot simulation function by turning off the valid flag of the snapshot simulation function according to an external instruction of terminating the snapshot simulation function; checking the number of bits set on the bitmap, calculating and storing the number of bits multiplied by a management unit size as a physical disk capacity of a snapshot, and resetting all bits on the bitmap, at terminating the snapshot simulation function; and reporting the stored physical disk capacity of the snapshot according to an external instruction of reporting the simulation result.

According to another aspect of the present invention, there is provided a snapshot simulation method, comprising the steps of: starting a snapshot simulation function about a specified logical volume by turning on a valid flag of the snapshot simulation function about the logical volume according to an external instruction of starting the snapshot simulation function; setting the corresponding bits on a bitmap for the specified logical volume corresponding to a range of update data and executing data updating processing, if the valid flag of the snapshot simulation function of the specified logical volume is on when a data updating request is issued; terminating the snapshot simulation function of the logical volume by turning off the valid flag of the snapshot simulation function about the specified logical volume according to an external instruction of terminating the snapshot simulation function; checking the number of bits set on the bitmap corresponding to the logical volume, calculating and storing the number of bits multiplied by a management unit size as a physical disk capacity of a snapshot, and resetting all bits on the bitmap corresponding to the logical volume, at terminating the snapshot simulation function; and reporting the stored physical disk capacity of the snapshot according to an external instruction of reporting the simulation result.

According to still another aspect of the present invention, there is provided a program product embodied on a storage portion of a computer and comprising code that, when said program product is executed, subject said computer to operate as a disk array device comprising: bitmap information storage means for storing a bitmap indicating presence or absence of updating for each management unit of a logical volume; bitmap information updating means for updating the bitmap of the bitmap information storage means; updating range determination means for determining which management units of the logical volume cover a range of specified update data and giving notice of bits on the bitmap of the bitmap information storage means corresponding to the management units; snapshot simulation function management means for turning on a valid flag of the snapshot simulation function according to an external instruction of starting the snapshot simulation function to start the snapshot simulation function and turning off the valid flag of the snapshot simulation function according to an external instruction of terminating the snapshot simulation function to terminate the snapshot simulation function; snapshot simulation function control means for inquiring with the updating range determination means and receiving notice of the bits on the bitmap corresponding to the range of the update data, setting the corresponding bits on the bitmap of the bitmap information storage means by means of the bitmap information updating means, and executing data updating processing, if the valid flag of the snapshot simulation function is on when a data updating request is issued; and snapshot simulation result reporting means for checking the number of bits set on the bitmap of the bitmap information storage means, calculating and storing the number of bits multiplied by a management unit size as a physical disk capacity of a snapshot, resetting all bits on the bitmap of the bitmap information storage means by means of the bitmap information updating means, and reporting the physical disk capacity of the stored snapshot according to an external instruction of reporting the simulation result, when receiving an instruction of terminating the snapshot simulation function from the snapshot simulation function management means.

According to another aspect of the present invention, there is provided a program product embodied on a storage portion of a computer and comprising code that, when said program product is executed, subject said computer to operate as a disk array device comprising: bitmap information storage means for storing a valid flag indicating whether a snapshot simulation function is effective for each logical volume and a bitmap indicating presence or absence of updating for each management unit of the logical volume; bitmap information updating means for updating the valid flag of the bitmap information storage means and the bitmap; updating range determination means for determining which management units of the logical volume cover a range of specified update data and giving notice of bits on the bitmap corresponding to the logical volume of the bitmap information storage means corresponding to the management units; snapshot simulation function management means for turning on the valid flag of the snapshot simulation function of the specified logical volume according to an external instruction of starting the snapshot simulation function to start the snapshot simulation function of the logical volume and turning off the valid flag of the snapshot simulation function of the specified logical volume according to an external instruction of terminating the snapshot simulation function to terminate the snapshot simulation function of the logical volume; snapshot simulation function control means for inquiring with the updating range determination means and receiving notice of the bits on the bitmap corresponding to the range of the update data, setting the corresponding bits on the bitmap of the specified logical volume of the bitmap information storage means by means of the bitmap information updating means, and executing data updating processing, if the valid flag of the snapshot simulation function of the specified logical volume is on when a data updating request is issued; and snapshot simu-
lation result reporting means for checking the number of bits set on the bitmap corresponding to the logical volume of the bitmap information storage means, calculating and storing the number of bits multiplied by a management unit size as a physical disk capacity of a snapshot, resetting all bits on the bitmap corresponding to the logical volume of the bitmap information storage means by means of the bitmap information updating means, and reporting the physical disk capacity of the stored snapshot according to an external instruction of reporting the simulation result, when receiving an instruction of terminating the snapshot simulation function from the snapshot simulation function management means.

BRIEF DESCRIPTION OF THE DRAWINGS

FIG. 7 is a flowchart showing an operation of the disk array device having the snapshot simulation function according to the first embodiment of the present invention; and FIG. 8 is a block diagram of a concrete configuration of a disk array device having a snapshot simulation function according to a second embodiment of the present invention.

DETAILED DESCRIPTION OF THE PREFERRED EMBODIMENTS

The preferred embodiments of the present invention will now be described in detail hereinafter with reference to the accompanying drawings.

First Embodiment

Figure 1:
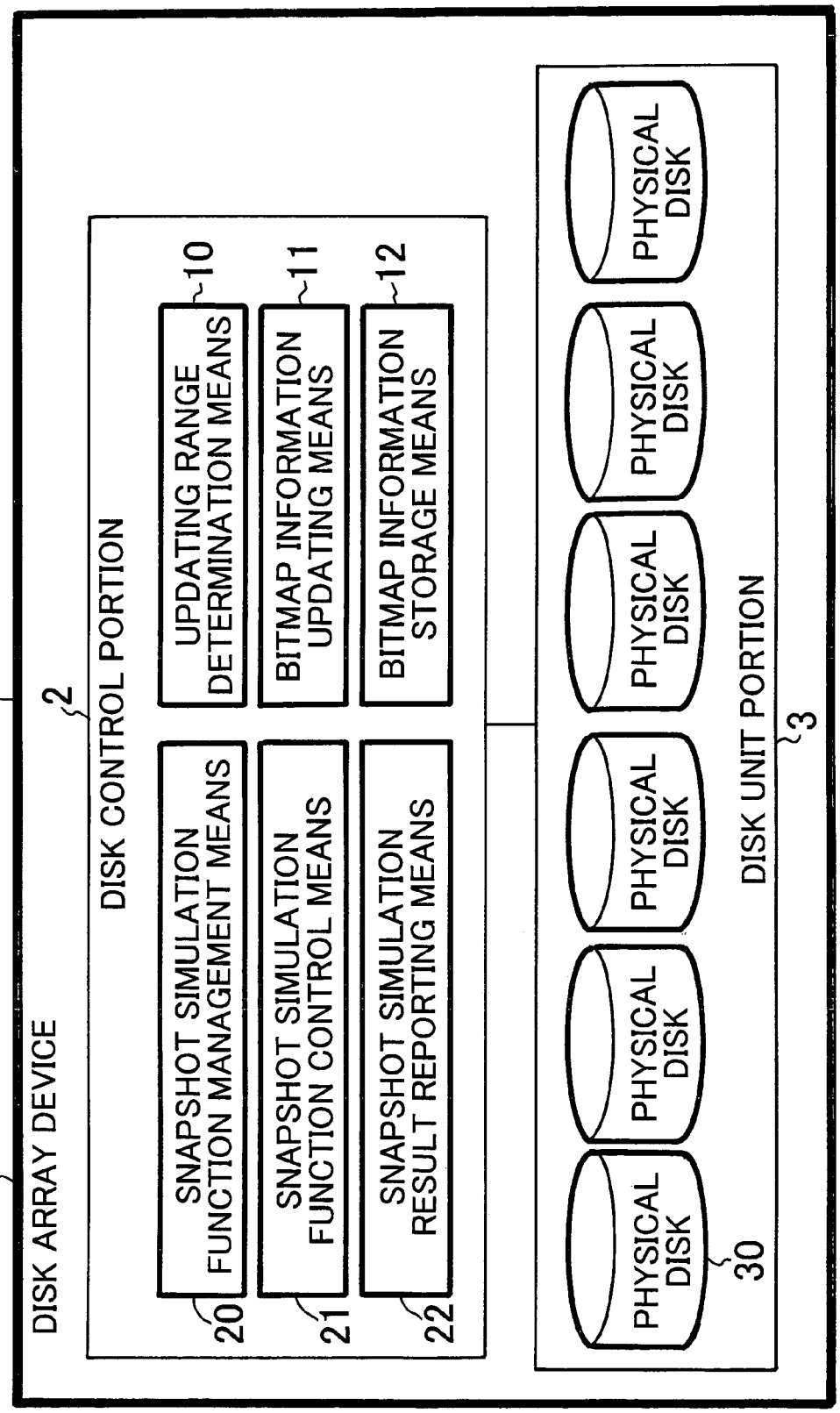
FIG. 1 is a block diagram showing a configuration of a disk array device having a snapshot simulation function according to a first embodiment of the present invention.

Referring to FIG. 1, disk array device 1 having a snapshot simulation function, according to a first embodiment of the present invention, comprises disk control portion 2 and disk unit portion 3 having a plurality of physical disks 30. The disk array device 1 is connected to a host computer (hereinafter, referred to as host) 100 and updates or refers to data according to an instruction from the host 100. The disk unit portion 3 records data with the plurality of physical disks 30 in a redundant array of independent disks (RAID) configuration and submits them to the host 100 as logical volumes. The RAID has a configuration in which data is divided and data read/write processing is performed for the plurality of disks in parallel.

The disk control portion 2 includes updating range determination means 10, bitmap information updating means 11, bitmap information storage means 12, snapshot simulation function management means 20, snapshot simulation function control means 21, and snapshot simulation result reporting means 22.

Figure 2:
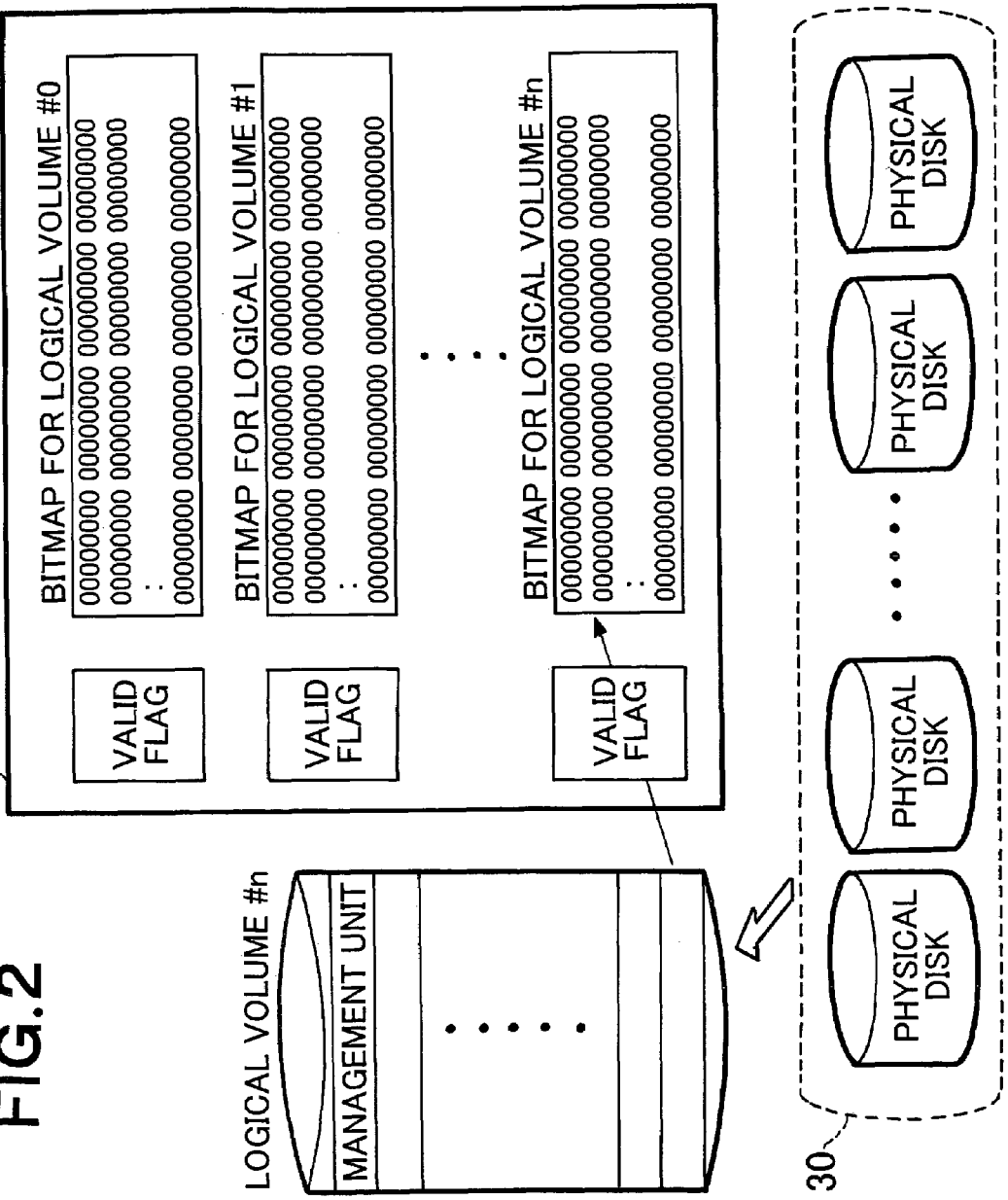
FIG. 2 is a diagram for explaining a relation between logical volume and bitmap information storage means in the disk array device having the snapshot simulation function according to the first embodiment.

Upon receiving a data updating request from the host 100, the updating range determination means 10 determines which management units of a logical volume cover a range of the update data on the basis of a specified updating start logical address and its size and gives notice of bits on the bitmap corresponding to the logical volume of the bitmap information storage means 12 corresponding to these management units. Specifically, as shown in FIG. 2, the logical volume is divided into management units of a certain size, and therefore the updating range determination means 10 determines the management units covering the range from an updating start logical address to an updating end logical address (=the updating start logical address+the size) and gives notice of corresponding bits on the bitmap. For example, assuming that the logical volume #n is divided into management units each having a certain size m, where m*n is a first logical address of the logical volume #n and (m+1)*n−1 is a last logical address thereof, the updating range determination means 10 determines the bits on the bitmap on the basis of the information.

The bitmap information updating means 11 sets or resets the bits on the bitmap for each logical volume of the bitmap information storage means 12. The bitmap information updating means 11 turns on or off the valid flag for each logical volume of the bitmap information storage means 12.

The bitmap information storage means 12 stores a valid flag indicating whether the snapshot simulation function is effective for each logical volume and a bitmap in a table format for each logical volume. Regarding the bits on the bitmap, the logical addresses of the logical volume are divided in units of a certain management unit size and the divided sections are associated with bits on the bitmap as management units in one-to-one correspondence (see FIG. 2).

The snapshot simulation function management means 20 turns on the valid flag of the snapshot simulation function of a specified logical volume according to an instruction of starting the snapshot simulation function from the host 100 or a maintenance terminal and starts the snapshot simulation function about the specified logical volume. In addition, the snapshot simulation function management means 20 turns off the valid flag of the snapshot simulation function of the specified logical volume according to an instruction of terminating the snapshot simulation function from the host 100 or the maintenance terminal and terminates the snapshot simulation function about the specified logical volume.

Figure 3:
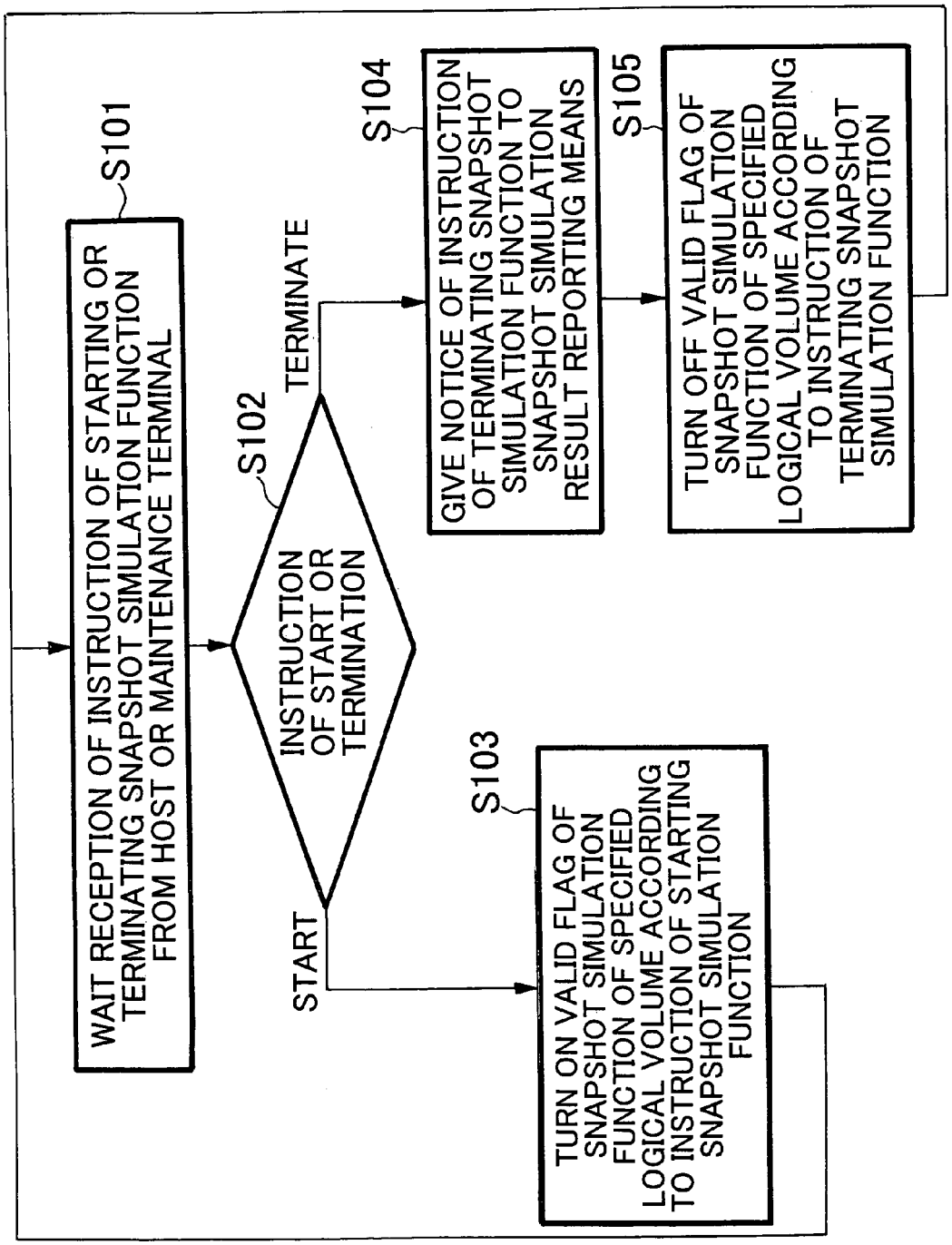
FIG. 3 is a flowchart showing processing of snapshot simulation function management means in FIG. 1.

Referring to FIG. 3, processing of the snapshot simulation function management means 20 comprises step S101 of waiting a reception of the instruction of starting the snapshot simulation function or the instruction of terminating the snapshot simulation function, step S102 of determining the instruction of starting the snapshot simulation function or the instruction of terminating the snapshot simulation function, step S103 of turning on the valid flag of the snapshot simulation function, step S104 of giving notice of the instruction of terminating the snapshot simulation function, and step S105 of turning off the valid flag of the snapshot simulation function.

If the valid flag of the snapshot simulation function about the specified logical volume is on when a data updating request is issued from the host 100, the snapshot simulation function control means 21 inquires with the updating range determination means 10 and receives the notice of the bits on the bitmap corresponding to the range of the update data, sets the corresponding bits on the bitmap for the specified logical volume in the bitmap information storage means 12 by the bitmap information updating means 11, and executes data updating processing.

Figure 4:
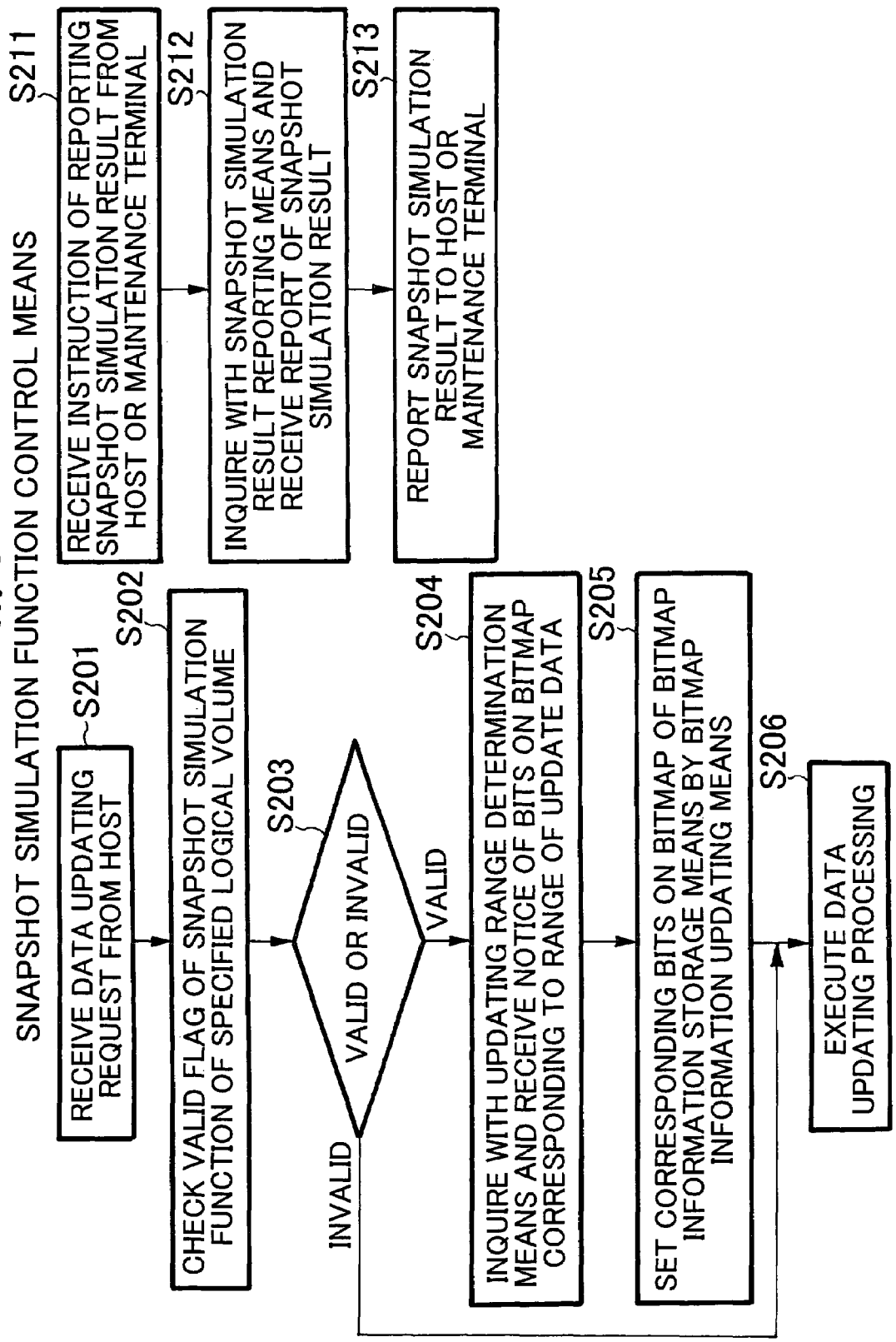
FIG. 4 is a flowchart showing processing of snapshot simulation function control means in FIG. 1.

Referring to FIG. 4, processing of the snapshot simulation function control means 21 at receiving the data updating request comprises step S201 of receiving a data updating request, step S202 of checking the valid flag of the snapshot simulation function, step S203 of determining whether the flag is valid or invalid, step S204 of inquiring for bits corresponding to the updating range, step S205 of setting the corresponding bits, and step S206 of executing the data updating processing.

Referring to FIG. 4 again, processing of the snapshot simulation function control means 21 at receiving the instruction of reporting the simulation result comprises step S211 of receiving the instruction of reporting the snapshot simulation result, step S212 of inquiring for the snapshot simulation result, and step S213 of reporting the snapshot simulation result.

The snapshot simulation result reporting means 22 reports the physical disk capacity of the snapshot calculated by the snapshot simulation function according to the instruction of reporting the simulation result from the host 100 or the maintenance terminal.

Figure 5:
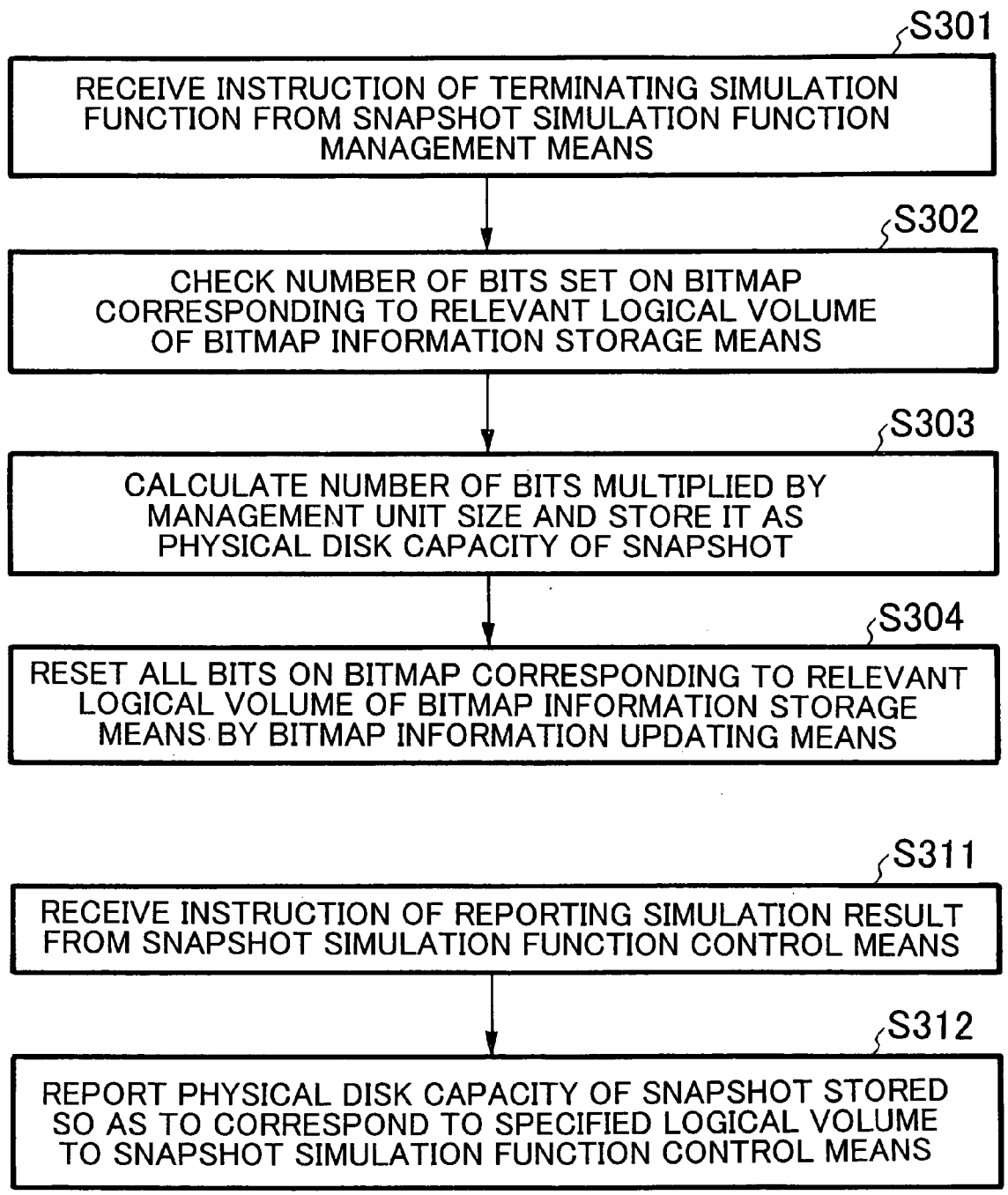
FIG. 5 is a flowchart showing processing of snapshot simulation result reporting means in FIG. 1.

Referring to FIG. 5, processing of the snapshot simulation result reporting means 22 at receiving the instruction of terminating the simulation function comprises step S301 of receiving the instruction of terminating the snapshot simulation function, step S302 of checking the number of set bits, step S303 of calculating the physical disk capacity of the snapshot, and step S304 of resetting all bits.

Referring to FIG. 5 again, processing of the snapshot simulation result reporting means 22 at receiving the instruction of reporting the simulation result comprises step S311 of receiving the instruction of reporting the snapshot simulation result and step S312 of reporting the physical disk capacity of the snapshot.

With reference to FIG. 7, the following describes an operation of the disk array device 1 having the snapshot simulation function according to the first embodiment configured as mentioned above.

When the host 100 issues a data updating request to the disk array device 1, it specifies a logical volume number, an updating start logical address, and a size in the disk unit portion 3 including the plurality of physical disks 30 in the RAID configuration.

The disk array device 1 manages a correspondence between a logical volume and a physical disk 30 and writes data into the physical disk 30 on the basis of the specified logical volume number, updating start logical address, and size.

Upon receiving the instruction of starting the snapshot simulation function from the host 100 or the maintenance terminal (step S101), the snapshot simulation function management means 20 determines whether it is the instruction of starting the snapshot simulation function or the instruction of terminating the snapshot simulation function (step S102). In the case of the instruction of starting the snapshot simulation function, the snapshot simulation function management means 20 turns on the valid flag of the snapshot simulation function about the logical volume specified in the instruction of starting the snapshot simulation function (step S103). The instruction of starting the snapshot simulation function can be given in units of a logical volume. Therefore, the disk array device 1 can contain both logical volumes in which the snapshot simulation function is effective and those in which it is not effective.

If the snapshot simulation function control means 21 receives a data updating request from the host 100 for the logical volume where the valid flag is set for the snapshot simulation function (step S201), it checks the valid flag of the snapshot simulation function about the specified logical volume (step S202) at receiving the data updating request and determines whether it is valid or not (step S203).

If the flag is valid, the snapshot simulation function control means 21 inquires with the updating range determination means 10 and receives notice of bits on the bitmap corresponding to the range of the update data (step S204).

The updating range determination means 10 determines the corresponding management units of the bitmap information storage means 12 from the specified updating start logical address and size and gives notice of the corresponding bits on the bitmap.

Subsequently, the snapshot simulation function control means 21 sets bits on the bitmap for the specified logical volume in the bitmap information storage means 12 corresponding to the notified bits by the bitmap information updating means 11 (step S205).

The bitmap information updating means 11 sets the bits in the corresponding management units in the bitmap information storage means 12. If the range of update data is larger than the management unit size, a plurality of bits are set. If the range of update data is smaller than the management unit size, still at least one bit is set. Depending on the updating start logical address and the size, the range may cover two or more management units. Therefore two or more bits may be set in some cases.

Subsequently, the snapshot simulation function control means 21 executes the data updating processing (step S206).

If the flag is invalid in step S203, the snapshot simulation function control means 21 immediately executes the data updating processing (step S206).

When the host 100 executes an operation job, a lot of data updating requests are issued and bits set on the bitmap corresponding to the logical volume of the bitmap information storage means 12 are increasingly.

Upon receiving the instruction of terminating the snapshot simulation function from the host 100 or the maintenance terminal (step S101), the snapshot simulation function management means 20 gives notice of the instruction of terminating the snapshot simulation function to the snapshot simulation result reporting means 22 (step S104).

Upon receiving the instruction of terminating the snapshot simulation function from the snapshot simulation function management means 20 (step S301), the snapshot simulation result reporting means 22 checks the number of bits set on the bitmap corresponding to the relevant logical volume in the bitmap information storage means 12 (step S302), calculates the number of bits multiplied by the management unit size and stores as the physical disk capacity of the snapshot (step S303), and resets all bits on the bitmap corresponding to the relevant logical volume in the bitmap information storage means 12 by the bitmap information updating means 11 (step S304).

The bitmap information updating means 11 resets bits of all management units of the relevant logical volume in the bitmap information storage means 12.

Subsequently, the snapshot simulation function management means 20 turns off the valid flag of the snapshot simulation function about the logical volume specified in the instruction of terminating the snapshot simulation function (step S105).

In data updating processing after receiving the instruction of terminating the snapshot simulation function, the snapshot simulation function is ineffective since the valid flag is off and therefore the device resumes ordinary processing of only updating data of the physical disks 30.

Upon receiving an instruction of reporting the snapshot simulation result from the host 100 or the maintenance terminal (step S211), the snapshot simulation function control means 21 gives notice of the instruction of reporting the snapshot simulation result to the snapshot simulation result reporting means 22 (step S212).

Upon receiving the instruction of reporting the snapshot simulation result from the snapshot simulation function control means 21 (step S311), the snapshot simulation result reporting means 22 reports the physical disk capacity of the snapshot stored so as to correspond to the specified logical volume to the snapshot simulation function control means 21 (step S312).

Upon receiving the report of the physical disk capacity of the snapshot from the snapshot simulation result reporting means 22 (step S212), the snapshot simulation function control means 21 reports to the host 100 or the maintenance terminal the physical disk capacity of the snapshot corresponding to the specified logical volume as a result of the snapshot simulation (step S213).

According to the first embodiment, it is possible to know the physical disk capacity required for a snapshot without creating the snapshot practically. In general, a snapshot is backed up periodically. Therefore, it is possible to estimate the physical disk capacity of the snapshot needed when the snapshot is practically introduced, by receiving a report of the physical disk capacity required for the snapshot several times by using the snapshot simulation function. Accordingly, it is possible to know an additional disk capacity appropriate for the snapshot in advance and to reduce wasteful cost in the structural design.

In the first embodiment, the snapshot simulation result reporting means 22 reports only the physical disk capacity of the snapshot of the specified logical volume when receiving the instruction of terminating the snapshot simulation function from the snapshot simulation function management means 20. However, it is also possible to add up physical disk capacities of the snapshot for all of the logical volumes and to report the added result as a physical disk capacity of the snapshot about all the logical volumes, or the added result as a physical disk capacity of the snapshot about all the logical volumes and the physical disk capacity of the snapshot of the specified logical volume.

Second Embodiment

Figure 6:
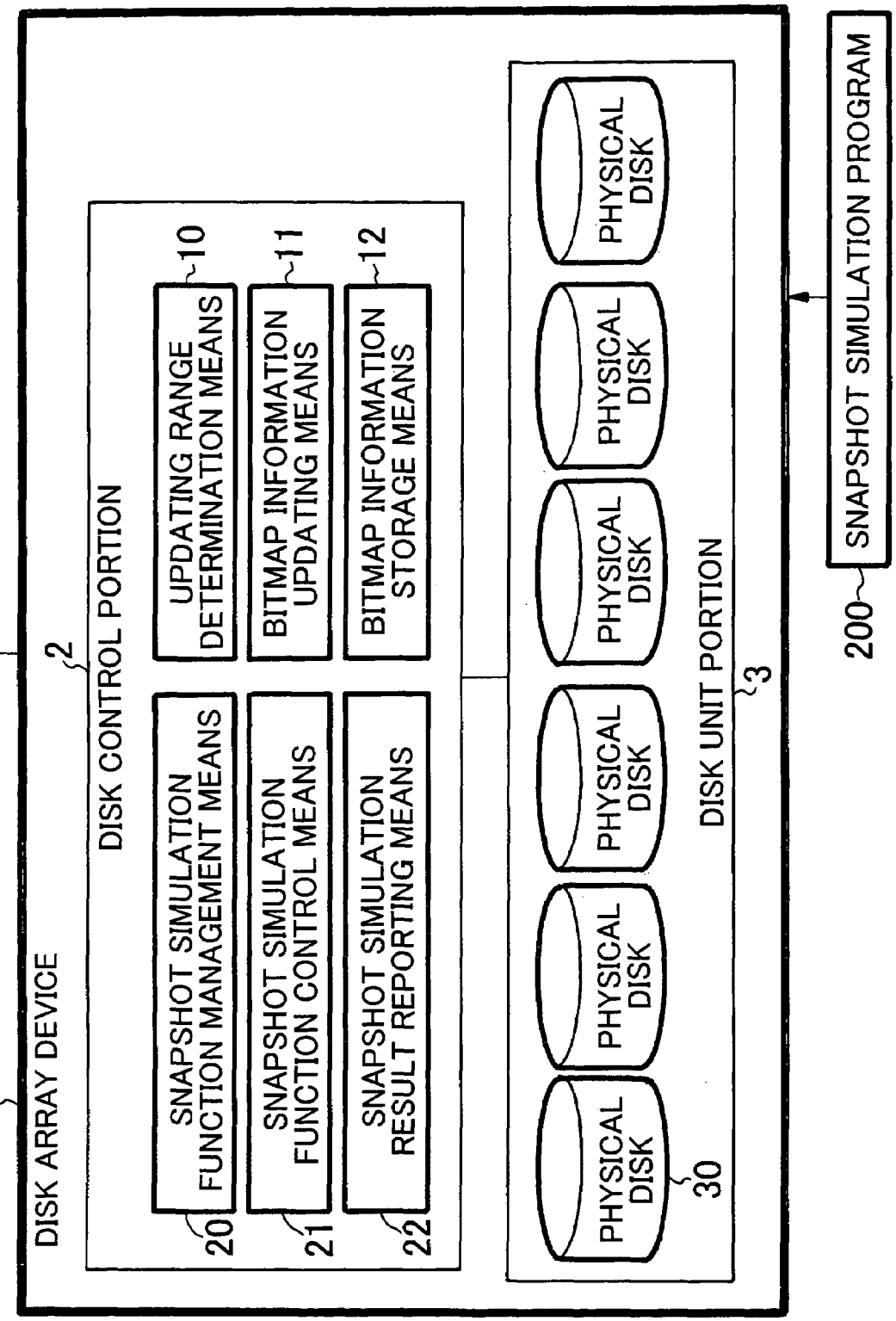
FIG. 6 is a block diagram showing a configuration of a disk array device having a snapshot simulation function according to a second embodiment of the present invention.

Referring to FIG. 6, there is shown a block diagram of a configuration of a disk array device having a snapshot simulation function according to a second embodiment of the present invention. The disk array device having the snapshot simulation function according to this embodiment differs from the disk array device having the snapshot simulation function according to the first embodiment shown in FIG. 1 only in that snapshot simulation program 200 is added.

The snapshot simulation program 200 is read into the disk array device 1. Thereby, it controls operations of the disk array device 1 as update range determination means 10, bitmap information updating means 11, bitmap information storage means 12, snapshot simulation function management means 20, snapshot simulation function control means 21, and snapshot simulation result reporting means 22. The operations of the disk array device 1 controlled by the snapshot simulation program 200 are completely the same as the operations of the disk array device 1 having the snapshot simulation function in the first embodiment. Therefore, their detailed description is omitted here.

Referring to FIG. 8, there is shown a block diagram of a concrete configuration of a disk array device having a snapshot simulation function according to a second embodiment of the present invention.

The disk control portion 2 of the disk array device 1 includes, for example, a recording portion such as ROM (read only memory) 45 for storing the snapshot simulation program 200, CPU 43 for executing the snapshot simulation program 200, a memory such as RAM 44 which is used for executing the snapshot simulation program 200, host control portion 41 and disk unit control portion 42.

What is claimed is:

1. A disk array device having a snapshot simulation function, comprising:

bitmap information storage means for storing a bitmap indicating presence or absence of updating for each management unit of a logical volume;

bitmap information updating means for updating the bitmap of said bitmap information storage means;

updating range determination means for determining which management units of the logical volume cover a range of specified update data and giving notice of bits on the bitmap of said bitmap information storage means corresponding to the management units;

snapshot simulation function management means for turning on a valid flag of the snapshot simulation function according to an external instruction of starting the snapshot simulation function to start the snapshot simulation function and turning off the valid flag of the snapshot simulation function according to an external instruction of terminating the snapshot simulation function;

snapshot simulation function control means for inquiring with said updating range determination means and receiving notice of the bits on the bitmap corresponding to the range of update data, setting the corresponding bits on the bitmap in said bitmap information storage means by said bitmap information updating means, and executing data updating processing, if the valid flag of the snapshot simulation function is on when a data updating request is issued; and snapshot simulation result reporting means for checking the number of bits set on the bitmap of said bitmap information storage means, calculating and storing the number of bits multiplied by a management unit size as a physical disk capacity of a snapshot, resetting all bits on the bitmap of said bitmap information storage means by said bitmap information updating means, and reporting the physical disk capacity of the stored snapshot according to an external instruction of reporting the simulation result, when receiving an instruction of terminating the snapshot simulation function from said snapshot simulation function management means.

2. A disk array device having a snapshot simulation function, comprising:

bitmap information storage means for storing a valid flag indicating whether a snapshot simulation function is effective for each logical volume and a bitmap indicating presence or absence of updating for each management unit of the logical volume;

bitmap information updating means for updating the valid flag of said bitmap information storage means and the bitmap;

updating range determination means for determining which management units of the logical volume cover a range of specified update data and giving notice of bits on the bitmap corresponding to the logical volume of said bitmap information storage means corresponding to the management units;

snapshot simulation function management means for turning on a valid flag of the snapshot simulation function about a specified logical volume according to an external instruction of starting the snapshot simulation function to start the snapshot simulation function about the logical volume and turning off the valid flag of the snapshot simulation function of the specified logical volume according to an external instruction of terminating the snapshot simulation function to terminate the snapshot simulation function about the logical volume;

snapshot simulation function control means for inquiring with said updating range determination means and receiving notice of the bits on the bitmap corresponding to the range of update data, setting the corresponding bits on the bitmap for the specified logical volume in said bitmap information storage means by said bitmap information updating means, and executing data updating processing, if the valid flag of the snapshot simulation function about the specified logical volume is on when a data updating request is issued; and snapshot simulation result reporting means for checking the number of bits set on the bitmap corresponding to the logical volume of said bitmap information storage means, calculating and storing the number of bits multiplied by a management unit size as a physical disk capacity of a snapshot, resetting all bits on the bitmap corresponding to the logical volume in said bitmap information storage means by said bitmap information updating means, and reporting the physical disk capacity of the stored snapshot according to an external instruction of reporting the simulation result, when receiving an instruction of terminating the snapshot simulation function from said snapshot simulation function management means.

3. The disk array device according to claim 2, wherein said snapshot simulation result reporting means counts the number of bits set by updating for each logical volume on the basis of the bitmap corresponding to the logical volume in said bitmap information storage means and reports a result of adding up products of multiplying the number of bits by the management unit size for all logical volumes as a physical disk capacity of a snapshot, when receiving an instruction of terminating the snapshot simulation function from said snapshot simulation function management means.

4. A snapshot simulation method, comprising the steps of:

starting a snapshot simulation function by turning on a valid flag of the snapshot simulation function according to an external instruction of starting the snapshot simulation function;

determining which management units of a logical volume cover a range of specified update data, setting corresponding bits on a bitmap, and executing data updating processing, if the valid flag of the snapshot simulation function is on when a data updating request is issued;

terminating the snapshot simulation function by turning off the valid flag of the snapshot simulation function according to an external instruction of terminating the snapshot simulation function;

checking the number of bits set on the bitmap, calculating and storing the number of bits multiplied by a management unit size as a physical disk capacity of a snapshot, and resetting all bits on the bitmap, when the snapshot simulation function is terminated; and reporting the stored physical disk capacity of the snapshot according to an external instruction of reporting the simulation result.

5. A snapshot simulation method, comprising the steps of:

starting a snapshot simulation function about a specified logical volume by turning on a valid flag of the snapshot simulation function about the logical volume according to an external instruction of starting the snapshot simulation function;

setting corresponding bits on a bitmap for the specified logical volume corresponding to a range of update data, and executing data updating processing, if the valid flag of the snapshot simulation function about the specified logical volume is on when a data updating request is issued;

terminating the snapshot simulation function of the specified logical volume by turning off the valid flag of the snapshot simulation function about the logical volume according to an external instruction of terminating the snapshot simulation function;

checking the number of bits set on the bitmap corresponding to the logical volume, calculating and storing the number of bits multiplied by a management unit size as a physical disk capacity of a snapshot, and resetting all bits on the bitmap corresponding to the logical volume, when the snapshot simulation function is terminated; and reporting the stored physical disk capacity of the snapshot according to an external instruction of reporting the simulation result.

6. The snapshot simulation method according to claim 5, further comprising the step of counting the number of bits set by updating for each logical volume on the basis of the bitmap corresponding to the logical volume and reporting a result of adding up products of multiplying the number of bits by the management unit size for all logical volumes as a physical disk capacity of a snapshot, at terminating the snapshot simulation function.

7. A program product embodied on a storage portion of a computer and comprising code that, when said program product is executed, subject said computer to operate as a disk array device comprising:

bitmap information storage means for storing a bitmap indicating presence or absence of updating for each management unit of a logical volume;

bitmap information updating means for updating the bitmap of said bitmap information storage means;

updating range determination means for determining which management units of the logical volume cover a range of specified update data and giving notice of bits on the bitmap of said bitmap information storage means corresponding to the management units;

snapshot simulation function management means for turning on a valid flag of the snapshot simulation function according to an external instruction of starting the snapshot simulation function to start the snapshot simulation function and turning off the valid flag of the snapshot simulation function according to an external instruction of terminating the snapshot simulation function;

snapshot simulation function control means for inquiring with said updating range determination means and receiving notice of the bits on the bitmap corresponding to the range of update data, setting the corresponding bits on the bitmap in said bitmap information storage means by said bitmap information updating means, and executing data updating processing, if the valid flag of the snapshot simulation function is on when a data updating request is issued; and snapshot simulation result reporting means for checking the number of bits set on the bitmap of said bitmap information storage means, calculating and storing the number of bits multiplied by a management unit size as a physical disk capacity of a snapshot, resetting all bits on the bitmap of said bitmap information storage means by said bitmap information updating means, and reporting the physical disk capacity of the stored snapshot according to an external instruction of reporting the simulation result, when receiving an instruction of terminating the snapshot simulation function from said snapshot simulation function management means.

8. A program product embodied on a storage portion of a computer and comprising code that, when said program product is executed, subject said computer to operate as a disk array device comprising:

bitmap information storage means for storing a valid flag indicating whether a snapshot simulation function is effective for each logical volume and a bitmap indicating presence or absence of updating for each management unit of the logical volume;

bitmap information updating means for updating the valid flag of said bitmap information storage means and the bitmap;

updating range determination means for determining which management units of the logical volume cover a range of specified update data and giving notice of bits on the bitmap corresponding to the logical volume of said bitmap information storage means corresponding to the management units;

snapshot simulation function management means for turning on a valid flag of the snapshot simulation function about a specified logical volume according to an external instruction of starting the snapshot simulation function to start the snapshot simulation function about the logical volume and turning off the valid flag of the snapshot simulation function of the specified logical volume according to an external instruction of terminating the snapshot simulation function to terminate the snapshot simulation function about the logical volume;

snapshot simulation function control means for inquiring with said updating range determination means and receiving notice of the bits on the bitmap corresponding to the range of update data, setting the corresponding bits on the bitmap for the specified logical volume in said bitmap information storage means by said bitmap information updating means, and executing data updating processing, if the valid flag of the snapshot simulation function about the specified logical volume is on when a data updating request is issued; and snapshot simulation result reporting means for checking the number of bits set on the bitmap corresponding to the logical volume of said bitmap information storage means, calculating and storing the number of bits multiplied by a management unit size as a physical disk capacity of a snapshot, resetting all bits on the bitmap corresponding to the logical volume in said bitmap information storage means by said bitmap information updating means, and reporting the physical disk capacity of the stored snapshot according to an external instruction of reporting the simulation result, when receiving an instruction of terminating the snapshot simulation function from said snapshot simulation function management means.

9. The program product according to claim 8, wherein said snapshot simulation result reporting means counts the number of bits set by updating for each logical volume on the basis of the bitmap corresponding to the logical volume in said bitmap information storage means and reports a result of adding up products of multiplying the number of bits by the management unit size for all logical volumes as a physical disk capacity of a snapshot, when receiving an instruction of terminating the snapshot simulation function from said snapshot simulation function management means.

* * * * *